United States Patent [19]

Boatwright

[11] Patent Number: 4,747,997
[45] Date of Patent: May 31, 1988

[54] NUCLEAR FUEL ROD LOADER FOR PULLING FUEL RODS INTO A FUEL ASSEMBLY SKELETON

[75] Inventor: David A. Boatwright, Columbia, S.C.

[73] Assignee: Westinghouse Electric Corp., Pittsburgh, Pa.

[21] Appl. No.: 31,953

[22] Filed: Mar. 30, 1987

[51] Int. Cl.⁴ .............................................. G21C 19/00
[52] U.S. Cl. ..................................... 376/261; 294/94; 294/906; 29/244; 29/723
[58] Field of Search .............. 376/261, 271, 260, 268; 294/86.25, 94, 906; 29/723, 726, 523, 244, 252, 253, 258–263, 157.3 R, 157.4, 400 N; 72/393; 254/18, 29 R

[56] References Cited

U.S. PATENT DOCUMENTS

| | | | |
|---|---|---|---|
| 3,085,825 | 4/1963 | Cauchois et al. | 294/906 |
| 3,549,187 | 12/1970 | Harbison | 294/86.31 |
| 3,604,746 | 9/1971 | Notari | 294/906 |
| 3,638,988 | 2/1972 | Brown | 294/86.25 |
| 3,698,756 | 10/1972 | Groves | 294/86.25 |
| 3,741,601 | 6/1973 | Dudley | 294/86.31 |
| 4,051,899 | 10/1977 | Fredd | 294/86.25 |
| 4,182,152 | 1/1980 | Vaill et al. | 29/723 |
| 4,192,715 | 3/1980 | Koshkin et al. | 294/906 |
| 4,202,727 | 5/1980 | Batjukov et al. | 294/906 |
| 4,204,910 | 5/1980 | Koshkin et al. | 294/906 |
| 4,236,967 | 12/1980 | Batjukov et al. | 376/271 |
| 4,244,616 | 1/1981 | Buchalet | 294/906 |
| 4,297,776 | 11/1981 | Fogg | 29/252 |
| 4,551,299 | 11/1985 | Shields | 376/261 |
| 4,571,802 | 2/1986 | Calhoun et al. | 29/244 |
| 4,639,993 | 2/1987 | Kapoor | 376/261 |
| 4,639,998 | 2/1987 | Shallenberger et al. | 29/723 |

FOREIGN PATENT DOCUMENTS

| | | | |
|---|---|---|---|
| 0035911 | 9/1981 | European Pat. Off. | 376/260 |
| 0146808 | 7/1985 | European Pat. Off. | 376/268 |
| 2537005 | 3/1977 | Fed. Rep. of Germany | 294/906 |

*Primary Examiner*—David H. Brown
*Assistant Examiner*—Daniel Wasil

[57] ABSTRACT

A nuclear fuel rod loader for pulling fuel rods into a fuel assembly skeleton has a rod gripper with slots defining fingers. The rod gripper passes through the grids of the skeleton on its way to a fuel rod magazine. An inner shaft of the rod gripper spreads open the fingers to engage a groove in the cavity of the end plug of the fuel rod. The rod gripper is retracted, pulling the coupled fuel rod into the fuel assembly skeleton. The rod gripper has a chamfer surface at the closed slot end of each slot to avoid the rod gripper damaging a dimple during entry into the grids of the fuel assembly skeleton. The rod gripper has a stress relief surface at the closed slot end of each slot to avoid failure in the flexing fingers.

12 Claims, 6 Drawing Sheets

NUCLEAR FUEL ROD LOADER FOR PULLING FUEL RODS INTO A FUEL ASSEMBLY SKELETON

CROSS REFERENCE TO RELATED APPLICATIONS

Reference is hereby made to the following copending applications dealing with related subject matter and assigned to the assignee of the present invention:

1. "Improved End Plug with Truncated Tapered Leading End Configuration" by D. A. Boatwright et al., assigned U.S. Ser. No. 797,331 and filed Nov. 12, 1985 (W.E. 52,879).

2. "Remote Repair System For Nuclear Fuel Rod Assemblies" by A. Kapoor et al., assigned U.S. Ser. No. 746,897 and filed June 20, 1985 (W.E. 52,720).

3. "Nuclear Fuel Rod Loading Fixture For Use In A Remote Repair System" by A. Kapoor, assigned U.S. Ser. No. 746,891 and filed June 20, 1985 (W.E. 52,721), now U.S. Pat. No. 4,639,993.

4. "Secondary-Side Tube Gripper" by K. L. Fields, assigned U.S. Ser. No. 912,690 and filed Sept. 26, 1986 (W.E. 51,902C).

5. "Gripper Apparatus And Method" by D. J. Fink, assigned U.S. Ser. No. 832,940 and filed Feb. 26, 1986 (W.E. 52,901).

BACKGROUND OF THE INVENTION

1. Field of the Invention:

The present invention relates generally to a nuclear fuel rod loader for pulling fuel rods into a fuel assembly skeleton and, more particularly, is concerned with a nuclear fuel rod loader having a rod gripper design which avoids snagging spacer grid dimples during the rod loading operation.

2. Description of the Prior Art:

In the typical nuclear reactor, the reactor core includes a large number of fuel assemblies each of which is composed of top and bottom nozzles with a plurality of elongated transversely spaced guide thimbles extending longitudinally between the nozzles and a plurality of transverse support grids axially spaced along and attached to the guide thimbles. Also, each fuel assembly is composed of a plurality of elongated fuel rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission. The reactor also has control rods which can be inserted into the guide thimbles to control the fission reaction. The fission reaction releases a large amount of energy in the form of heat. A liquid coolant is pumped upwardly through the core in order to extract some of the heat generated in the core for the production of useful work.

In the construction of a fuel assembly, the guide thimbles are affixed to the grids to form a fuel assembly skeleton. Then, the fuel rods are loaded into the skeleton, passing through the cells of the grids. Typically, a fuel rod loader is used which pulls the fuel rods into the grids. The loader has a rod gripper which is inserted through the skeleton, coupled to the end plug of a fuel rod, and then withdrawn, pulling the attached fuel rod into the skeleton. Finally, the top and bottom nozzles are affixed to the skeleton to complete the fabrication of the fuel assembly.

A typical nuclear fuel rod loader is disclosed in U.S. Pat. No. 4,297,776, hereby incorporated by reference. The loader described therein uses a rod gripper which couples to an external circumferential groove on a fuel rod end plug.

Figure 4:
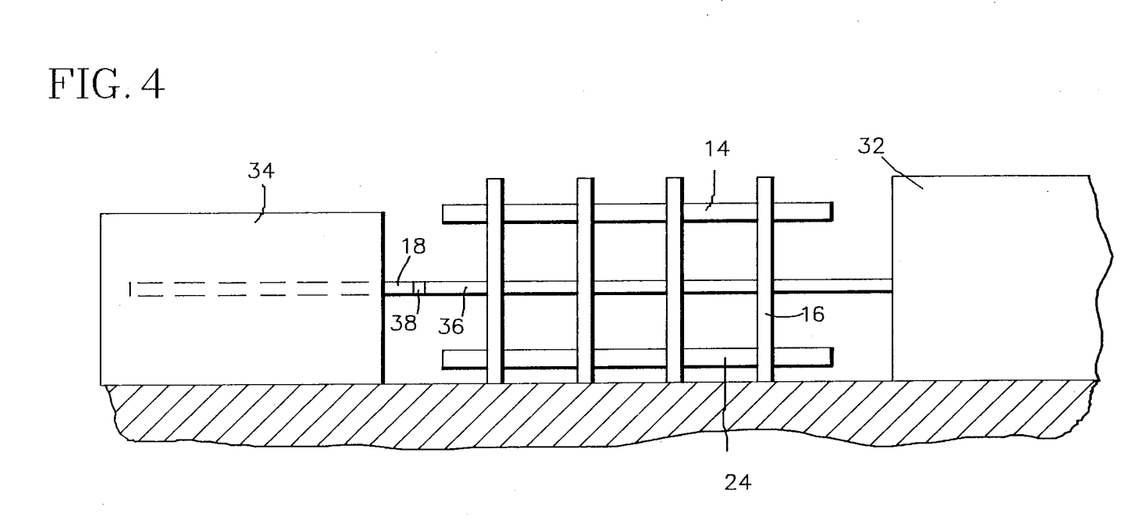
FIG. 4 is an elevational schematic view of the fuel rod loader of the invention about to pull a fuel rod from a fuel rod magazine back through the grids of FIG. 3 of the fuel assembly skeleton of FIG. 2.

Westinghouse U.S. patent application Ser. No. 797,331 entitled "Improved End Plug With Truncated Tapered Leading End Configuration" by D. A. Boatwright and W. Widner, filed 11/12/85, discloses a fuel rod gripper 46, as seen in FIG. 4, for loading (pulling) a nuclear fuel rod into a fuel assembly skeleton (see page 8, line 35 to page 9, line 18). The figure shows an enlarged, finger slot stress-relieving keyhole. This rod gripper (having three or four fingers), and including a version with the enlarged keyhole counterbored, has been in use for more than one year. Grippers of this design have a tendency to have their closed slot end snag on a grid dimple during insertion of the puller into the fuel assembly skeleton. This was true even when the keyhole was countersunk. Bent and broken-away dimples have occurred.

SUMMARY OF THE INVENTION

It is an object of the invention to provide a nuclear fuel rod loader with an improved rod gripper arrangement for releasably engaging an internal circumferential groove of a nuclear fuel rod end plug cavity without snagging on the grid dimples during insertion of the rod gripper into the fuel assembly skeleton.

It is another object of the invention to provide such a nuclear fuel rod loader having a rod gripper which will not fail under stress.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the nuclear fuel rod loader includes a nuclear fuel rod gripper having an outer tube and an inner shaft. The outer tube end portion has two or more longitudinal slots which define fingers therebetween. The finger ends are inwardly biased and have outwardly-projecting rim portions which together define a circular, circumferential rim which can be inserted into a nuclear fuel rod end plug cavity. The inner shaft can be inserted into the outer tube. The inner shaft has a terminus portion which can engage the finger ends spreading them apart and opening the rim for the rim portions to releasably engage the internal circumferential groove of the nuclear fuel rod end plug cavity permitting the nuclear fuel rod loader to pull the nuclear fuel rod from the fuel rod magazine into the spacer grids of the nuclear fuel assembly skeleton. At the closed end of each slot, a transition surface connects the outer tube's outer and inner surfaces. The transition surface includes an outwardly-facing, longitudinally-running, chamfer surface and an open-slot-end-facing stress relief surface. The chamfer surface is coextensive with the outer tube's outer surface, and the stress relief surface is coextensive with the outer tube's inner surface. The chamfer surface has a radially-transverse depth which is smaller than its longitudinal length. The stress relief surface has a stress relief radius.

Several benefits and advantages are derived from the invention. The chamfer surface feature prevents possible damage to the grid dimples caused by a closed slot end of the rod gripper snagging a grid dimple during insertion of the rod gripper into the grids of the fuel assembly skeleton. The stress relief surface feature prevents possible rod gripper failure due to stress from flexure of the rod gripper's fingers.

DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Reference will now be made in detail to several present preferred embodiments of the invention, some examples of which are illustrated in the accompanying drawings. In the drawings, like reference characters designate like or corresponding parts throughout the several views.

Figure 1:
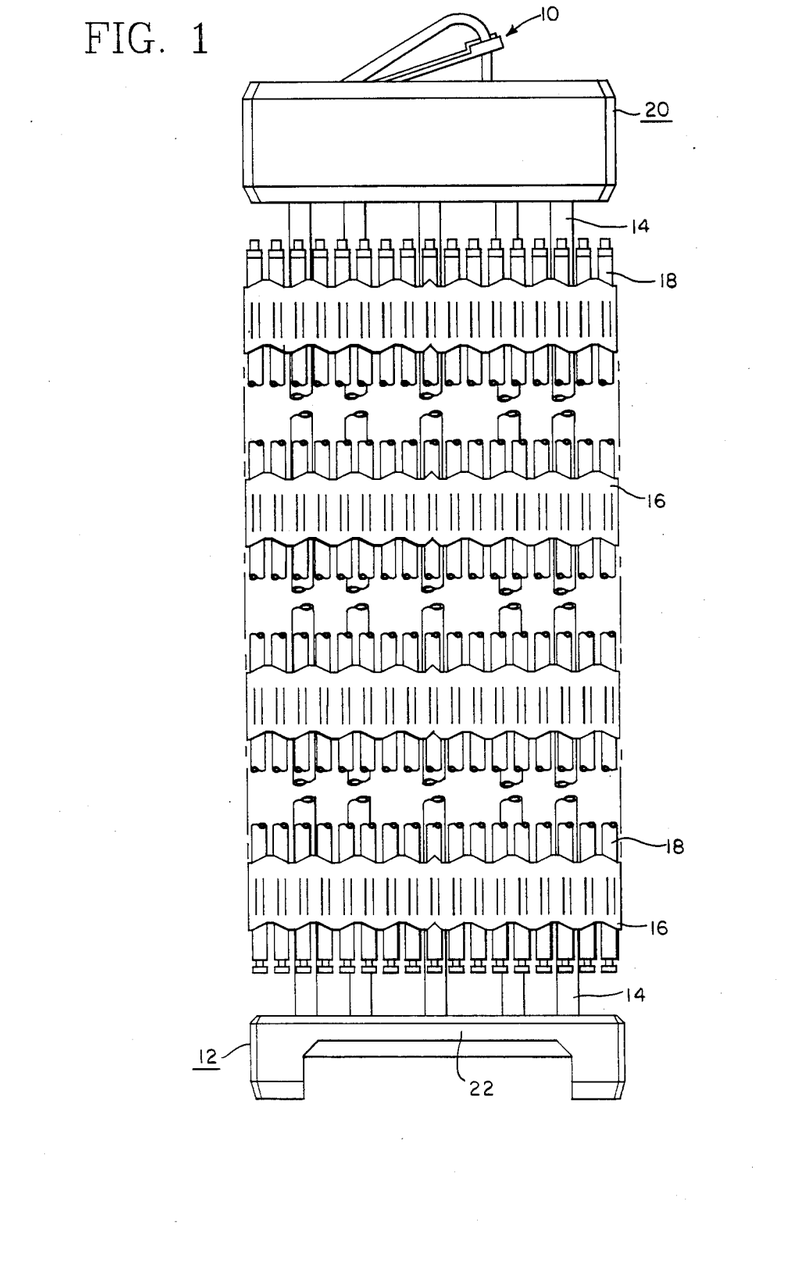
FIG. 1 is an elevational view of a nuclear fuel assembly which has had its fuel rods installed by the rod loader of the present invention.

In FIG. 1, a (typically 4.1148 meter long) nuclear fuel assembly 10 is shown in vertically foreshortened form. The fuel assembly 10 is the type used in a pressurized water reactor (PWR) and basically includes a bottom nozzle 12 for supporting the assembly on the lower core plate (not shown) in the core region of a nuclear reactor (not shown), and a number (typically 24) of longitudinally extending (typically 3.9624 meter long) guide thimbles 14 which project upwardly from the bottom nozzle 12. The fuel assembly 10 further includes a plurality of transverse grids 16 axially spaced along the guide thimbles 14 and an organized array of elongated fuel rods 18 (typically 9.5 millimeters in diameter) transversely spaced and supported by the grids 16. Also the assembly has a top nozzle 20 attached to the upper ends of the guide thimbles 14. The lower ends of the guide thimbles 14 are attached to the adaptor plate 22 of the bottom nozzle 12. In this region, each guide thimble 14 typically is surrounded by a grid sleeve (not shown). With such an arrangement of parts, the fuel assembly 10 forms an integral unit capable of being conventionally handled without damaging the assembly parts.

As mentioned above, the fuel rods 18 in the fuel assembly 10 are held in spaced relationship with one another by the grids 16 spaced along the fuel assembly length. Typically each fuel rod 18 contains nuclear fuel pellets of uranium dioxide (not shown). A liquid moderator/coolant, such as water or water containing boron, is pumped upwardly through the thimbles 14 and along the fuel rods 18 of the fuel assembly 10 in order to extract heat generated therein for the production of useful work. To control the fission process, a number of control rods (not shown) are reciprocally movable in the guide thimbles 14 located at predetermined positions in the fuel assembly 10.

Figure 2:
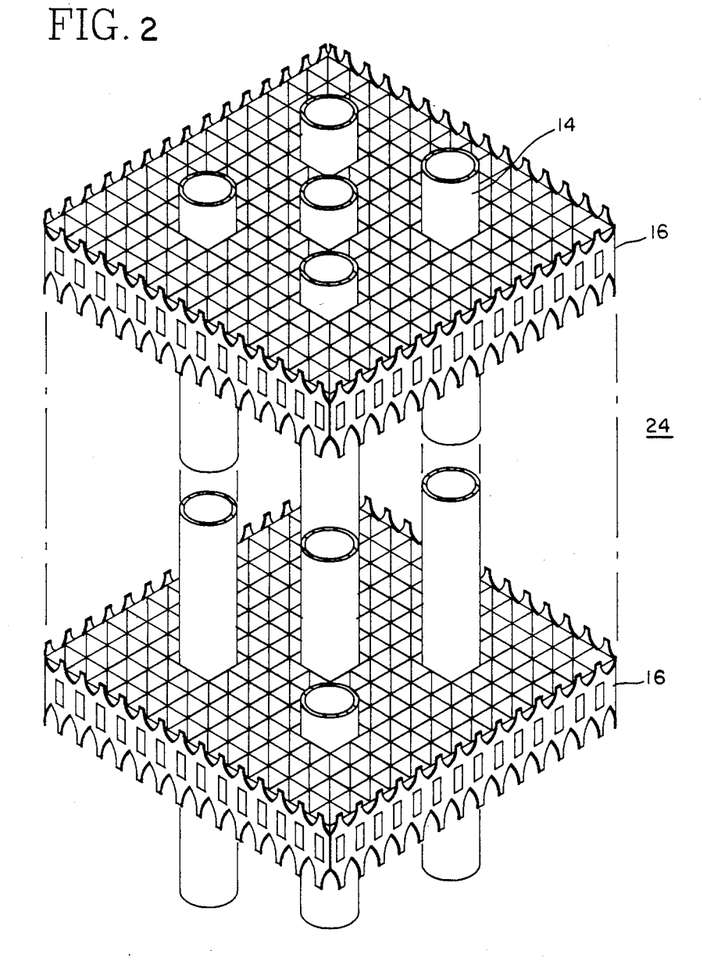
FIG. 2 is an isometric view of the fuel assembly skeleton portion of FIG. 1, the skeleton awaiting the loading of fuel rods into the grids.
Figure 3:
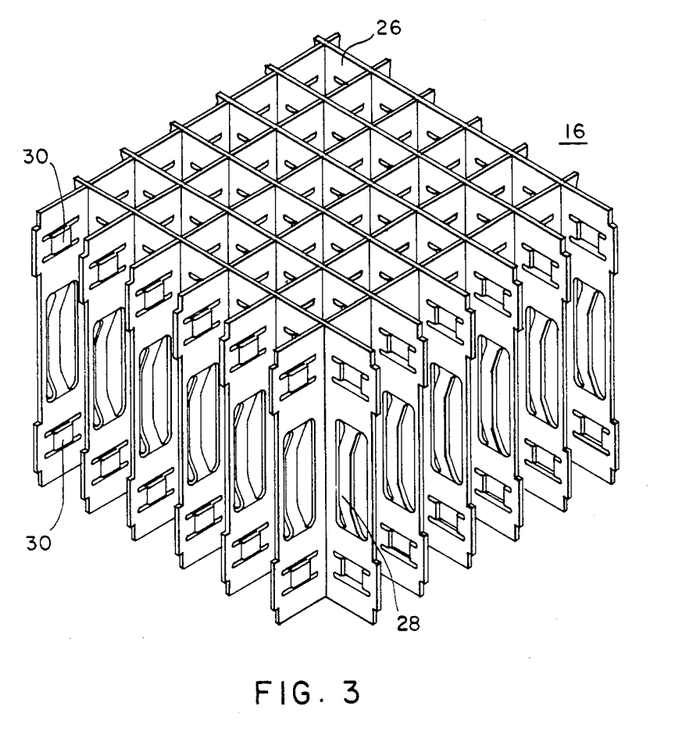
FIG. 3 is an isometric view of a grid of FIG. 2, with portions cutaway, showing the grid dimples which can snag on a conventional rod gripper of a fuel rod loader.

In the fabrication of a nuclear fuel assembly 10, the fuel rods 18 are loaded into a fuel assembly skeleton. The fuel assembly skeleton 14, as seen in FIG. 2, consists of the guide thimbles 14 attached to the grids 16. Each grid cell 26 has springs 28 and dimples 30, as seen in FIG. 3, which laterally support the fuel rod to be loaded therein.

Turning now to FIG. 4, there is seen the fuel rod storage and loading equipment of the invention which is used for loading fuel rods 18 into the fuel assembly skeleton 24 by pulling them from the bottom of the skeleton 24 through the top thereof. The equipment includes a fuel rod loader 32 and a fuel rod magazine 34. The loader 32 has an extendable and retractable rod gripper 36. When the fuel assembly skeleton 24 is located between the loader 32 and the magazine 34, with the loader 32 at the bottom of the assembly skeleton 24 and the magazine 34 at the top thereof, the rod gripper 36 is extended longitudinally outward from the loader 32, through the spacer grids 16, and to the fuel rod magazine 34. There, the rod gripper 36 is brought into coupling engagement with the lower end plug 38 of one of the fuel rods 18 stored in the magazine 34, and then is longitudinally retracted back, pulling the fuel rod 18 out of the magazine 34 and into and through the grids 16 of the fuel assembly skeleton 24.

Figure 5:
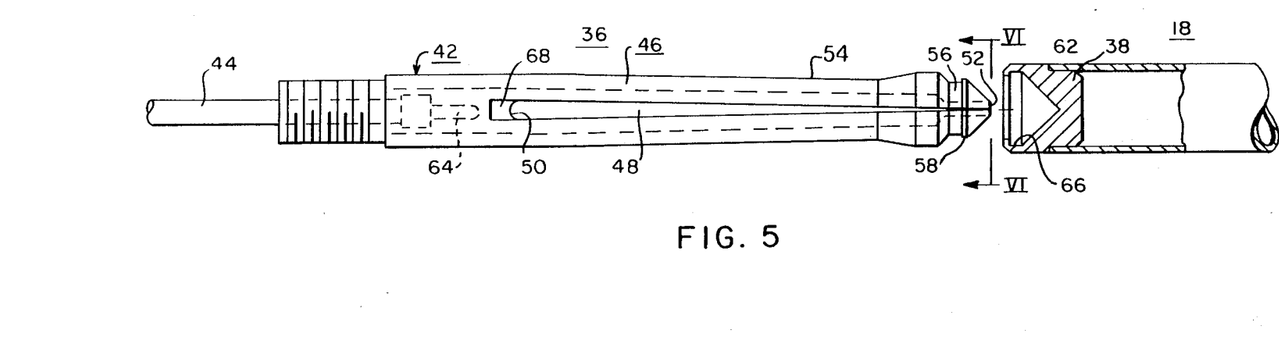
FIG. 5 is an enlarged side view of the fuel rod gripper portion of the fuel rod loader of FIG. 4 about to enter the cavity of an end plug of a fuel rod, with the fuel rod shown in cross section and with dashed lines showing hidden features of the rod gripper.
Figure 6:
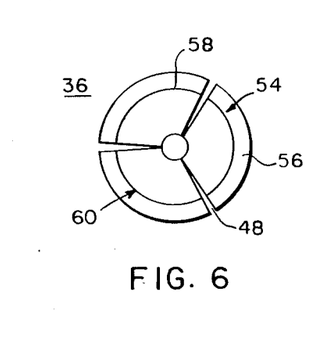
FIG. 6 is a front end view of the rod gripper of FIG. 5.
Figure 7:
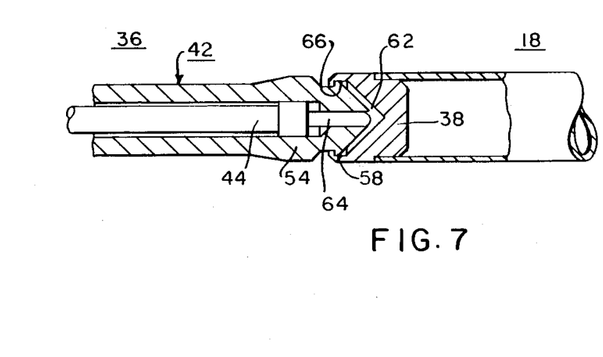
FIG. 7 is a view of the fuel rod gripper of FIG. 5 which has engaged the internal circumferential groove of the cavity of the end plug of the fuel rod, with the fuel rod shown in cross section and with a portion of the rod gripper cut away.

Referring to FIGS. 5, 6, and 7, the nuclear fuel rod gripper 36 (typically made of hardened tool steel) has an outer tube 42 and an inner shaft 44. The outer tube 42 includes an end portion 46 having a plurality (such as two, three, or four, but preferably three) of longitudinal slots 48. Each slot 48 has a closed slot end 50 and an open slot end 52, with the slots 48 defining fingers 54 (typically 50.8 millimeters long) therebetween. Each finger 54 includes an inwardly-biased finger end 56 having a generally outwardly-projecting rim portion 58. When the fingers 54 are in a relaxed, unstressed state, the rim portions 58 taken together define a generally circular and circumferential rim 60 (as seen in FIG. 6) which is longitudinally insertable into the cavity 62 of the lower end plug 38 of a nuclear fuel rod 18.

The inner shaft 44, of the rod gripper 36, is insertable in the outer tube 42. The inner shaft 44 includes a terminus portion 64 which is longitudinally engageable with the inwardly-biased finger ends 56 to spread them apart. This opens the rim 60 causing the rim portions 58 to releasably engage the internal circumferential groove 66 in the cavity 62 of the lower end plug 38 of the fuel rod 18. Thus engaged, the rod gripper 36 can be retracted by the fuel rod loader 32 to pull the fuel rod 18 into the fuel assembly skeleton 24. Thereafter, withdrawing the inner shaft 44 from the end portion 46 of the outer tube 42 will disengage the inwardly-biased finger ends 56 from the groove 66 allowing the rod gripper 36 to be removed from the cavity 62 of the lower end plug 38 and hence to be removed from the fuel rod 18.

Figure 8:
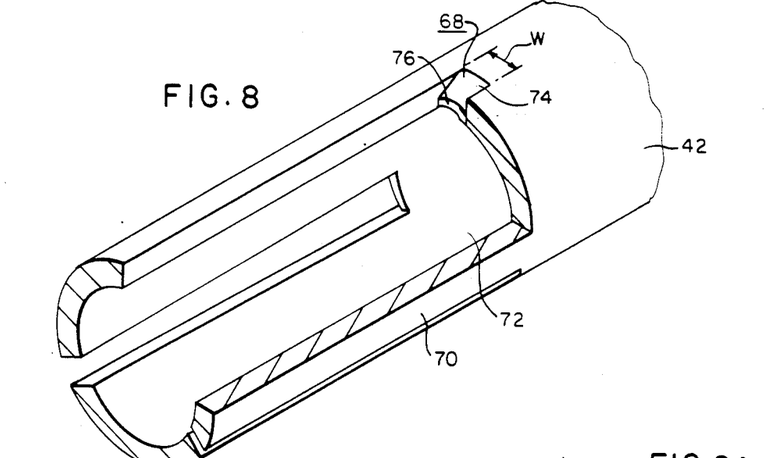
FIG. 8 is an enlarged, isometric cutaway view of the closed slot end region of the rod gripper of FIGS. 5 and 7 showing the chamfer surface and the stress relief surface.

The transition surface 68 (seen in FIG. 5 and more clearly in FIG. 8) which connects the outer surface 70 (typically 8.0 millimeters in diameter) of the outer tube 42 with the inner surface 72 (typically 6.1 millimeters in diameter) of the outer tube 42 at the closed slot end 50 of each slot 48 is designed to avoid the possibility of the outer tube 42 snagging a relatively rigid dimple 30 (see FIG. 3) when the rod gripper 36 passes through a cell 26 of the grid 16 on its way to the fuel rod magazine 34 (see FIG. 4). It is noted that the relatively resilient springs 28 in the grids 16 pose no such snagging problem.

Figure 9A:
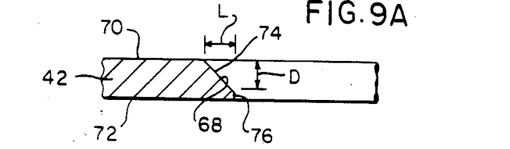
FIG. 9a is a cross sectional view of the closed slot end region of FIG. 8 in which the chamfer surface, designed to avoid snagging the grid dimples, is planar.
Figure 9B:
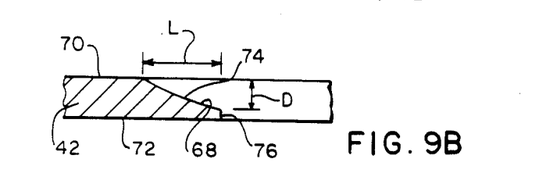
FIG. 9b is a cross sectional view of the closed slot end region of FIG. 8 in which the chamfer surface, designed to avoid snagging the grid dimples, is a convex circular arc.

Each transition surface 68 includes a generally outwardly-facing, longitudinally-running, chamfer surface 74 which is coextensive with the outer surface 70 of the outer tube 42. Should a closed slot end 50 contact a dimple 30 during insertion of the rod gripper 36 into the grid 16, it will do so with its chamfer surface 74. Prior art grippers each had a steep dimple-contacting transition surface, wherein a longitudinal cross section passing through the slot centerline would show a generally flat surface oriented between 45 and 90 degrees (and typically 45 or 90 degrees) from the outer tube's longitudinal axis. Also, the prior art transition surface has a transverse width which was larger (by as much as a factor of two) than the separation distance between two fingers. In the present invention, the chamfer surface 74 has a radially-transverse depth D which is smaller than its longitudinal Length L (see FIGS. 9A and 9B). A typical D to L ratio would be 0.36. Although the chamfer surface 74 can be planar (see FIG. 9A), preferably, the chamfer surface 74 has a generally convex circular arc shape (typically an arc of a circle having a 45 millimeter diameter) which is generally constant across its transverse width W (see FIGS. 8 and 9B). An exemplary chamfer surface 74 has its transverse width W generally equal to the separation distance (typically 1.45 millimeters) between its two adjacent fingers 54 proximate the closed slot end 50 of its adjacent slot 48 (see FIGS. 5 and 8).

Figure 10:
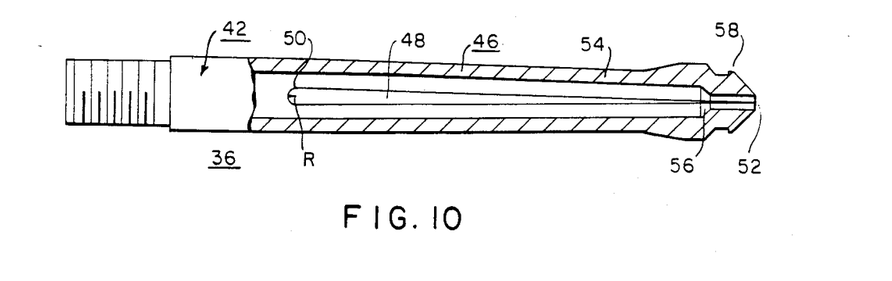
FIG. 10 is a side view of the closed slot end region of FIG. 8, with a portion of the rod gripper cut away showing the inside of the closed slot end, including the stress relieving radius.

Each transition surface 68 also includes a generally open-slot-end-facing stress relief surface 76 (see FIG. 8) having a stress relief radius R (see FIG. 10), with the stress relief surface 76 being coextensive with the inner surface 72 of the outer tube 42. Preferably, the stress relief radius R has a length generally equal to one half the separation distance between its two adjacent fingers 54 proximate the closed slot end 50 of its adjacent slot 48. In an exemplary case, the stress relief surface 76 and the chamfer surface 74 are coextensive and have generally equal (within 10%) transverse depths.

It is noted that with the above-described invention, the fuel rod loader (32) may employ a plurality of rod grippers (36), working in unison, to simultaneously pull a like plurality of fuel rods (18) into the fuel assembly skeleton (24) in one operation.

It will be apparent that many modifications and variations are possible in light of the above teachings. It. therefore, is to be understood that within the scope of the appended claims, the invention may be practiced other than as specifically described.

I claim:

1. In a nuclear fuel rod loader for pulling a nuclear fuel rod from a fuel rod magazine into spacer grids of a nuclear reactor fuel assembly skeleton, a nuclear fuel rod gripper for releasably engaging an internal circumferential groove of a nuclear fuel rod end plug cavity, said gripper comprising:
    (a) an outer tube having an end portion, said end portion having a plurality of longitudinal slots each having a closed slot end and an open slot end, said slots defining fingers therebetween, said fingers each having inwardly-biased finger ends, said inwardly-biased finger ends each having a generally outwardly-projecting rim portion, said rim portions together defining a generally circular and circumferential rim, said rim longitudinally insertable into said nuclear fuel rod end plug cavity; and
    (b) an inner shaft insertable in said outer tube, said inner shaft having a terminus portion, said terminus portion longitudinally engagable with said inwardly-biased finger ends to spread them apart to open said rim for said rim portions to releasably engage said internal circumferential groove of said nuclear fuel rod end plug cavity; and
    wherein the outer surface of said outer tube is connected to the inner surface of said outer tube at said closed slot end of each said slot by a transition surface, each said transition surface including a generally outwardly-facing, longitudinally-running, chamfer surface and a generally open-slot-end-facing stress relief surface, with said chamfer surface coextensive with said outer surface of said outer tube and said stress relief surface coextensive with said inner surface of said outer tube, wherein said chamfer surface has a radially-transverse depth and a longitudinal length, with said radially-transverse depth smaller than said longitudinal length, and wherein said stress relief surface has a stress relief radius.

2. The nuclear fuel rod loader of claim 1, wherein said chamfer surface and said stress relief surface are coextensive.

3. The nuclear fuel rod loader of claim 1, wherein said chamfer surface is generally planar.

4. The nuclear fuel rod loader of claim 1, wherein said chamfer surface has a generally convex circular arc shape which is generally constant across its transverse width.

5. The nuclear fuel rod loader of claim 1, wherein the transverse width of said chamfer surface generally equals the separation distance between its two adjacent said fingers proximate said closed slot end of its adjacent said slot.

6. The nuclear fuel rod loader of claim 1, wherein the length of said stress relief radius generally equals half the separation distance between its two adjacent said fingers proximate said closed slot end of its adjacent said slot.

7. The nuclear fuel rod loader of claim 2, wherein said chamfer surface is generally planar.

8. The nuclear fuel rod loader of claim 7, wherein the transverse width of said chamfer surface generally equals the separation distance between its two adjacent said fingers proximate said closed slot end of its adjacent said slot.

9. The nuclear fuel rod loader of claim 8, wherein the length of said stress relief radius generally equals half the separation distance between its two adjacent said fingers proximate said closed slot end of its adjacent said slot.

10. The nuclear fuel rod loader of claim 2, wherein said chamfer surface has a generally convex circular arc shape which is generally constant across its transverse width.

11. The nuclear fuel rod loader of claim 10, wherein the transverse width of said chamfer surface generally equals the separation distance between its two adjacent said fingers proximate said closed slot end of its adjacent said slot.

12. The nuclear fuel rod loader of claim 11, wherein the length of said stress relief radius generally equals half the separation distance between its two adjacent said fingers proximate said closed slot end of its adjacent said slot.

* * * * *